United States Patent [19]

Jack

[11] 4,018,257
[45] Apr. 19, 1977

[54] SELF-FLANGING NUT AND JOINT CONSTRUCTION

[75] Inventor: James A. Jack, Windsor, Canada

[73] Assignee: Cold Fasteners, Inc., Windsor, Canada

[22] Filed: Dec. 15, 1975

[21] Appl. No.: 640,897

[52] U.S. Cl. .............................. 151/41.72; 29/512; 151/41.73; 29/4.32
[51] Int. Cl.² ........................................ F16B 39/28
[58] Field of Search ................ 151/41.72, 41.73; 85/32 K; 29/432, 432.2, 512, 523; 52/758 F

[56] References Cited

UNITED STATES PATENTS

| | | | |
|---|---|---|---|
| 1,112,525 | 10/1914 | Darling | 151/41.73 X |
| 1,479,358 | 1/1924 | Behringer | 151/41.72 X |
| 1,591,183 | 7/1926 | Reynolds | 151/41.73 X |
| 1,954,761 | 4/1934 | Wiggin | 151/41.72 X |
| 2,007,179 | 7/1935 | Bullis | 151/41.72 X |
| 2,026,757 | 1/1936 | Swanstrom | 151/41.72 |
| 2,327,656 | 8/1943 | Meek | 151/41.72 X |
| 3,204,679 | 9/1965 | Walsh | 151/41.72 |
| 3,276,499 | 10/1966 | Reusser | 151/41.73 |
| 3,722,565 | 3/1973 | Miller et al. | 151/41.73 |
| 3,894,331 | 7/1975 | Ragettli | 151/41.72 X |

FOREIGN PATENTS OR APPLICATIONS

| | | | |
|---|---|---|---|
| 370,948 | 4/1932 | United Kingdom | 151/41.72 |

*Primary Examiner*—Ramon S. Britts
*Attorney, Agent, or Firm*—Barnes, Kisselle, Raisch & Choate

[57] ABSTRACT

A self-flanging nut construction utilizing a tubular body having a laterally extending flange at one end and an opening therethrough, said opening having a first portion and a second portion of differing cross sectional areas, the first portion being formed with a thread and the second portion defining a riveting flange. A plurality of circumferentially spaced serrations or ribs are provided on the periphery of said body adjacent said flange. When the nut is placed adjacent a sheet metal body having an opening therein with the opening in alignment with the opening in the nut and the nut is forced against said plate, the metal surrounding said opening in said plate is first deformed axially of the opening to form a tubular portion and thereafter the riveting flange is deformed laterally outwardly over the end of the tubular portion formed on said plate. The circumferential spacing, width and thickness, and length of the ribs is such that the metal is deformed outwardly at the ribs while the metal between the ribs remains substantially as formed into the tubular portion.

2 Claims, 9 Drawing Figures

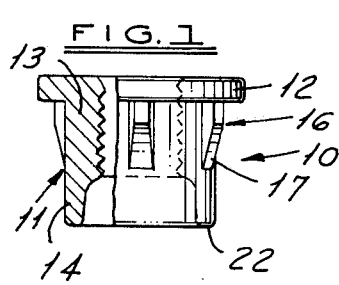
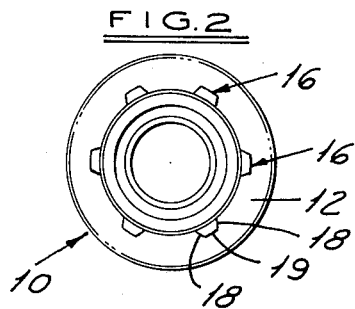
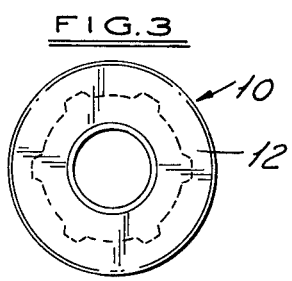
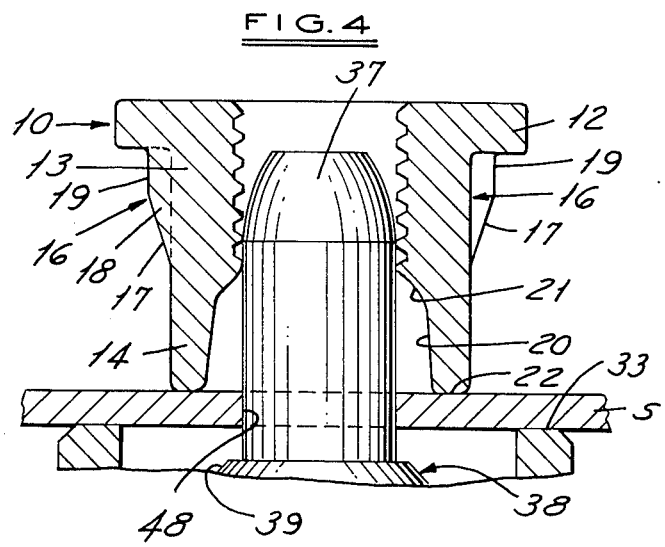
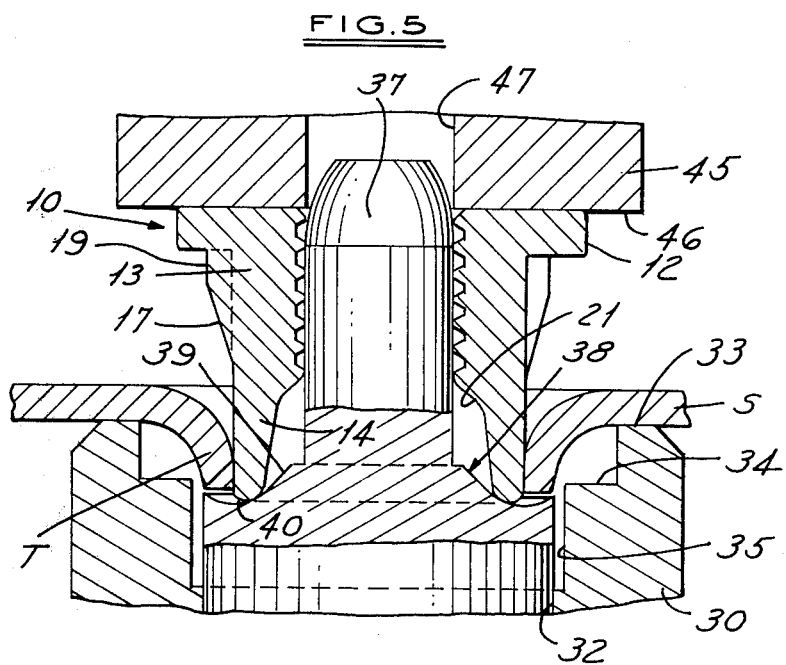

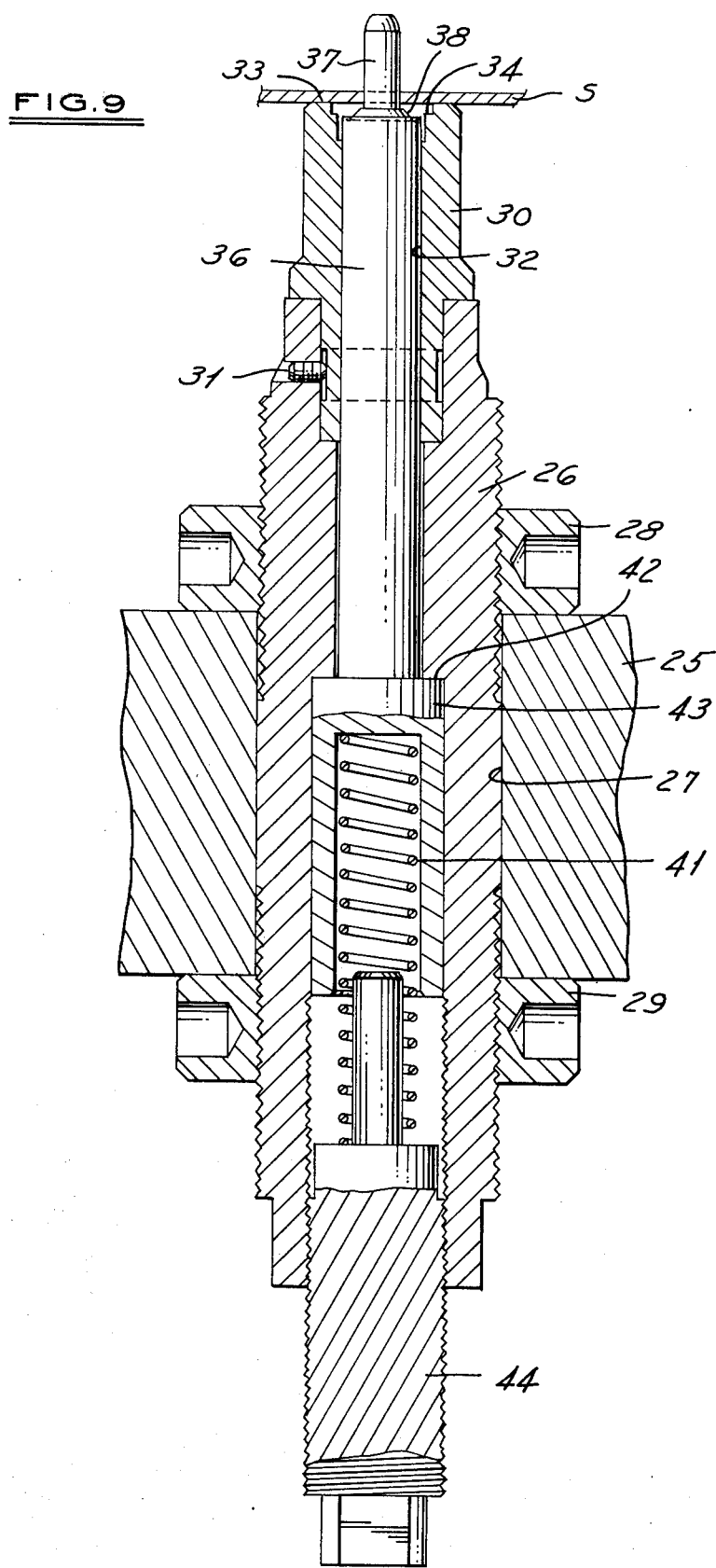

SELF-FLANGING NUT AND JOINT CONSTRUCTION

This invention relates to a self-flanging nut and joint construction.

BACKGROUND OF THE INVENTION

In automotive use and the like, it is common to provide weld nuts and pierce nuts for attachment to sheet metal parts to provide a means for fastening bolts, screws and the like.

It has heretofore been suggested that a self-flanging nut construction may be made by utilizing a tubular body having a laterally extending flange at one end and an opening therethrough, said opening having a first portion and a second portion of differing cross sectional areas, the first portion being formed with a thread and the second portion defining a riveting flange. A plurality of circumferentially spaced serrations or ribs are provided on the periphery of said body adjacent said flange. When the nut is placed adjacent a sheet metal body having an opening therein with the opening in alignment with the opening in the nut and the nut is forced against said plate, the metal surrounding said opening in said plate is first deformed axially of the opening to form a tubualr portion and thereafter the riveting flange is deformed laterally outwardly over the end of the tubular portion formed on said plate.

Among the objects of the invention are to provide an improved nut, joint and method and apparatus for making the joint, wherein high strength is obtainded with minimum metal wherein excellent torque characteristics are provided, wherein the nut is readily located and properly positioned with respect to the metal part and wherein the same nut can be utilized for different gauge metal parts.

SUMMARY OF THE INVENTION

In accordance with the invention, the circumferential spacing, width and thickness, and length of the ribs is such that the metal is deformed outwardly at the ribs while the metal between the ribs remains substantially as formed into the tubular portion.

DESCRIPTION OF THE DRAWINGS

FIG. 1 is a part sectional elevational view of a nut embodying the invention.

FIG. 2 is a bottom end view of the same.

FIG. 3 is a top end view of the same in a joint construction.

FIG. 4 is a part sectional elevational view of a portion of an apparatus embodying the invention.

FIG. 5 is a view similar to FIG. 4 showing the parts in a different operative position.

FIG. 9 is a vertical sectional view of the apparatus.

DESCRIPTION

Figure 6:
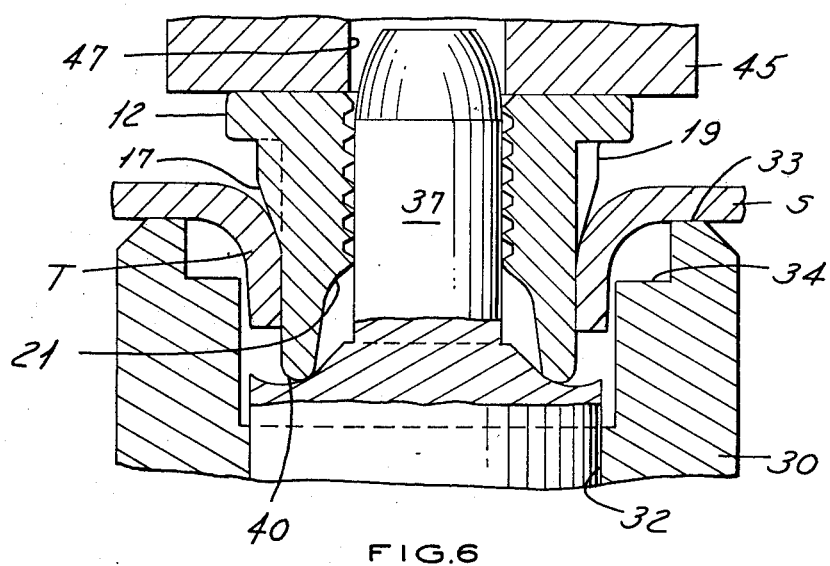
FIG. 6 is a view similar to FIG. 5 showing the parts in a further operative position.

Referring to FIGS. 1–4, the nut 10 embodying the invention comprises a tubular cylindrical body 11 having a circular flange 12 extending radially outwardly at one end and an opening therethrough with a first threaded portion 13 and a second unthreaded portion 14 having a greater internal diameter than portion 15 to define a riveting flange portion. A plurality of circumferentially spaced serrations or ribs 16 are provided on the periphery of the cylindrical body 11 adjacent the flange 12, each serration being generally U-shaped in cross section and having a beveled lower end 17. The width of each rib 16 is greater than its thickness. The circumferential spacing of said ribs 16 is such that the space between ribs is several times greater than the width of the ribs 16. The sides 18 of ribs 16 are inclined and the apices 19 are flat. The internal surface 20 of portion 14 is tapered slightly inwardly from the free end and connects with portion 13 by a gradually curved portion 21. The length of ribs 16 is substantially equal to the axial length of portion 13. The thickness of flange 12 is less than the length of ribs 16. The inner edge of the free end of portion 14 is rounded as at 22.

Referring to FIG. 9, the apparatus for forming the joint by utilizing the nut 10 comprises a base 25 on which a body 26 is adjustably mounted. Body 26 extends into a vertical opening 27 in base 25 and is locked in vertically adjustable position by collars 28, 29 threaded on body 26 and engaging the top and bottom surfaces of base 25, respectively.

A first die element 30 is mounted on the upper end of body 26 and locked therein by a set screw 31. Die element 30 includes cylindrical opening 32 which extends entirely through the die element 30 and a surface 33 at the upper end that is at a right angle to the axis of the opening 32. The upper end of opening 32 is provided with a stepped recess 34. A portion 35 of opening 32 below recess 34 is of greater diameter.

A second die element 36 extends upwardly through opening 32 and has the same diameter as the opening 32. At the upper end die element 36 is formed with a locating pin 37 of reduced diameter. An annular recess 38 is provided at the area of juncture of the lower end of the pin 37 and the intermediate portion of the die element 36. The annular recess preferably includes an inclined frusto-conical portion 39 and an arcuate portion 40.

Die element 36 is yeildingly urged upwardly by a spring 41 against a stop formed by a shoulder 42 on body 26 which is engaged by a stepped portion 43 of die element 36. Spring 41 bears against the die element at its upper end and against as stop 44 is threaded into the lower end of body 26.

A platen 45 is movable toward and away from die element 32 and includes a bottom surface 46 which engages the flange 12 of nut 10 and has an opening 47 into which pin 37 can extend.

Figure 7:
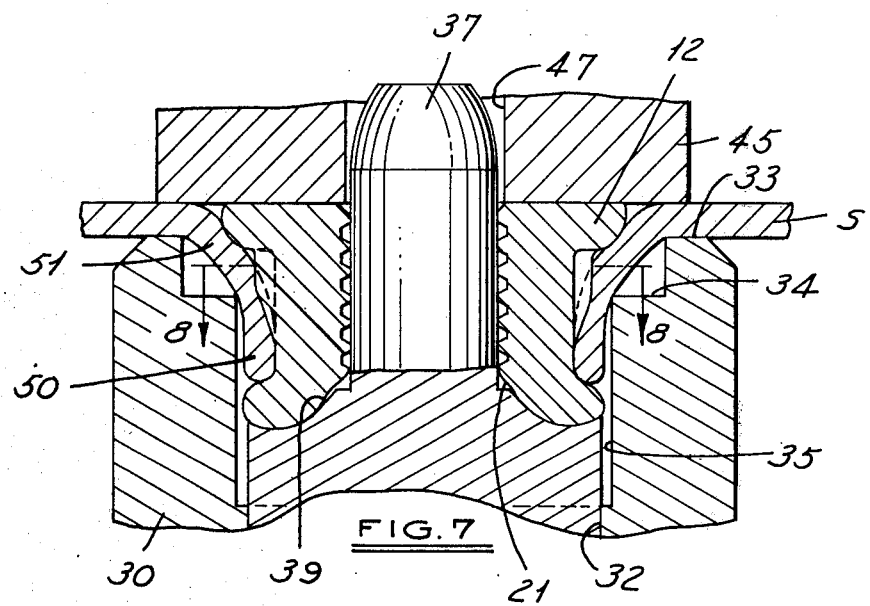
FIG. 7 is a view similar to FIG. 6 showing the parts in a further operative position.
Figure 8:
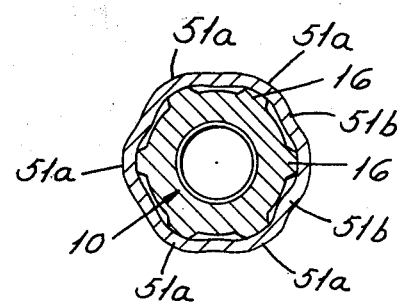
FIG. 8 is a sectional view taken along the line 8—8 in FIG. 7.

In operation, as shown in FIGS. 4–7, a metal sheet or plate S having an opening 48 therein is placed over the pin 37 and a nut 10 is placed over the pin 37 with its lower end engaging the sheet. Platen 45 is then lowered in one continuous movement.

Initially, as shown in FIG. 4, the lower end of the nut 10 engages the portion of the sheet S surrounding the pin 37 and interposed between the opening O and the upper end of the die element 32 to deform the sheet and define a tubular portion T which has its periphery spaced from the wall of the opening 32.

Continued movement of the platen 45 completes the formation of the tubular portion and brings the lower end of the nut into engagement with the annular recess 38. (FIG. 5)

Continued movement of the platen 45 causes the nut 10 to move axially and deforms the lower end of the nut 10 against the lower end of the tubular portion T while bringing the upper end of the nut 10 into flush relationship with the top surface of the plate S. In the final movement of the platen 45, the surface 46 of the force applying tool 45 engages the upper surface of the plate S, clamping the plate S between the surface 46 and the surface 33, as well as applying a force to the upper end of the nut.

Finally when the platen 45 is retracted, the die element 36 is moved upwardly by spring 41 to eject the nut and plate joint.

The resultant joint comprises the flat portion of plate S and an integral tubular portion 50 connected to the flat portion of the plate by an intermediate annular section 51. The lower edge of the flange 12 is impressed and deforms portions of an annular section 51 and ribs 16 are impressed at 51b and deform circumferentially spaced parts of intermediate portion 51 while intermediate portions 51b of the annular section 51 between ribs 16 remain substantially as formed into tubular form in close proximity to the portions of the nut 10 between the ribs 16.

The resultant joint provides a strong high torque connection between the nut and the plate.

I claim:
1. In a self-flanging nut construction, the combination comprising
a tubular body having a laterally extending annular flange at one end and an opening therethrough,
said flange having a substantially flat outer surface coextensive with said end of said body,
said opening having a first portion and a second portion of differing cross sectional area,
the outer surface of said tubular body being cylindrical,
said first portion of said opening in said body adjacent said flange being formed with a thread substantially throughout its axial extent,
said second portion defining a riveting flange having a free end remote from said first portion,
the inner surface of said second portion being uniformly tapered inwardly in the direction of said first portion substantially throughout its axial extent,
the outer edge of said free end of said riveting flange being curved at a given radius smoothly blending into said cylindrical outer surface,
the inner edge of said free end being curved at a lesser radius than said outer edge and smoothly blending into said tapered inner surfce of said second portion,
a plurality of circumferentially spaced ribs on the cylindrical periphery of said body adjacent said flange and extending axially along said body,
the length of said ribs being substantially equal to the axial length of said first portion of said body,
the thickness of said flange being less than the length of said ribs,
each said rib being generally U-shaped in cross section and having a greater width than thickness,
the circumferential spacing between said ribs being several times greater than the width thereof such that a portion of the cylindrical periphery of said body is interposed between adjacent ribs,
each said rib extending from said flange toward said second portion to form a free end,
said free end of each said rib being tapered,
the radial thickness of said second portion of said body being substantially constant throughout and having an internal surface which is slightly tapered inwardly,
the radial thickness of said second portion being such that when the nut is placed adjacent a sheet metal plate having an opening therein with the opening in alignment with the opening in the nut and the nut is forced against said sheet metal plate, the metal surrounding said opening in said plate is deformed axially of the opening by said second portion to form a tubular portion, and thereafter when an axial force is applied to said free end of the riveting flange, the riveting flange is deformed laterally outwardly over the tubular portion formed on said plate.
2. The combination set forth in claim 1 wherein said flange has a circular periphery.

* * * * *